United States Patent Office 2,941,964
Patented June 21, 1960

2,941,964

COMPOSITION COMPRISING POLYSTYRENE, VOLATILE ORGANIC SOLVENT AND A CARBON DIOXIDE LIBERATING AGENT, AND PROCESS OF SIMULTANEOUSLY FOAMING AND EXTRUDING SAID COMPOSITION

John C. Houston and John J. Tress, Beaver Falls, Pa., assignors to Koppers Company, Inc., a corporation of Delaware No Drawing. Filed Nov. 16, 1954, Ser. No. 469,306

14 Claims. (Cl. 260—2.5)

This application is concerned with certain new extrudable expandable polystyrene compositions. It is further concerned with a method for the production of foamed polystyrene having substantially uniform small voids by extrusion on conventional extruding machines.

Presently the commercial production of foamed polystyrene involves utilizing systems wherein the material to be extruded is encased with a pressure system. For example a normally gaseous expanding agent is incorporated under pressure with polystyrene and the foamed material produced by extrusion. It will be realized that the system suffers the disadvantages both as to economy and safety of requiring a pressure system. In the past a variety of expanding agents have been proposed for the production of foamed polystyrene. For example, ethylbenzene in combination with steam has been proposed. Normally gaseous agents, such as, for example, methyl chloride have been used as referred to above. The combination of sodium bicarbonate and fatty acids has been proposed.

It has now been found, as a feature of this invention, that particularly desirable results are obtained by utilization in conventional extrusion equipment of a combination of polystyrene, a normally liquid hydrocarbon, a carbon dioxide liberating agent and an organic acid having at least 3.0 milli-equivalents of acidic hydrogen per gram. This combination of polystyrene with the above enumerated three components in amounts individually unsatisfactory to produce foamed polystyrene having substantially uniform small voids can be utilized in conventional non-pressurized extrusion equipment to yield foamed polystyrene having substantially uniform small voids. The economic advantage of using conventional extrusion equipment in comparison with pressurized equipment is obvious. Additionally, in utilizing the hereinafter specified amounts of hydrocarbon expanding agent in combination with the specified organic acid and carbon dioxide liberating agent it is possible to produce foamed polystyrene having minimum quantities of salts incorporated therein and thus the amount of material that might be considered as a contaminant is reduced.

The instant invention comprises a composition comprising polystyrene particles having integrated therewith from about 4½ to 9 percent of an aliphatic hydrocarbon boiling approximately in the range 30°–90° C. homogeneously admixed with a carbon dioxide liberating agent and an organic acid having at least about 3.0 milli-equivalents of acidic hydrogen per gram in amounts to produce upon reaction a total of from about one-tenth to five percent, based on the polystyrene particles containing the aliphatic hydrocarbon, of water and carbon dioxide.

The amounts of acid and carbon dioxide liberating agent used are based on their respective equivalent weights. In order to avoid the corrosive effect of free acid on the extrusion equipment, it is preferred to use a slight excess of carbon dioxide liberating agent.

The invention contemplates a method of producing foamed polystyrene having substantially small uniform voids comprising homogeneously admixing polystyrene particles having integrated therewith from 4½ to 9 percent of an aliphatic hydrocarbon boiling approximately in the range 30°–90° C. with a carbon dioxide liberating agent and an organic acid having at least about 3.0 milli-equivalents of acidic hydrogen per gram, the latter two substances in amounts to produce upon reaction a total of from about one-tenth to five percent based on the polystyrene particles containing the aliphatic hydrocarbon, of water and carbon dioxide and extruding said admixture in a conventional plastic extrusion machine. It will be realized that the temperature at which the extruder is maintained is dependent upon such variables as the rate of extrusion and the nature of the particular polymer being extruded. It has been found that, in general, extrusion temperatures in the range of from about 280° to 375° F. are satisfactory using the above described compositions of this invention. However, extruder temperatures in the range of approximately 450° F. can be utilized providing the rate of extrusion is increased accordingly.

In a preferred form the compositions of this invention contemplate the utilization of polystyrene particles having from about 6 to about 8 percent of an aliphatic hydrocarbon boiling in the range of about 30–70° C., an alkali carbonate or bicarbonate and an organic acid having at least ten milli-equivalents of acidic hydrogen per gram in amounts to produce upon reaction a total of from about two-tenths to two percent, based on the polystyrene particles containing the aliphatic hydrocarbon, of water and carbon dioxide.

As set forth above desirable results are obtained in the compositions and methods of this invention utilizing organic acids having at least about 3.0 milli-equivalents of acidic hydrogen per gram. It is to be noted, however, that particularly desirable results are obtained when utilizing the organic acids having at least 10 milli-equivalents of acidic hydrogen per gram. Excellent results are obtained utilizing oxalic or citric acid, the latter being preferred from a toxicity standpoint. Other suitable acids are, for example, malonic, maleic, fumaric, succinic, itaconic, citraconic, malic, adipic, formic, acetic, propionic, tartaric, phthalic, butyric, lactic, chloracetic and diglycollic, all of which have at least 10 milli-equivalents of acidic hydrogen per gram. Several of the foregoing solid acids are available in the form of their hydrates which can be used herein. The water present in the hydrated form of the acid is to be taken into consideration in computing the amount of water and carbon dioxide producing upon reaction of the acid with a carbon dioxide liberating agent.

These acids, when utilized in the above set forth quantities, yield compositions which upon extrusion produce polystyrene having substantially uniform small voids and a density less than about five lbs. per cubic foot, which density is particularly desirable in commercial products.

Other acids which yield desirable results are illustrated, for example, by stearic, oleic, caprylic, enanthic, benzoic, caproic, benzene sulfonic, toluene sulfonic and valeric acids. These acids, when utilized in the above set forth quantities, yield compositions which upon extrusion produce foamed polystyrene having densities in the range of about 6–20 lbs. per cubic foot. It will be realized that for ease of handling the acids solid at ordinary temperatures are preferred.

It is to be noted that acid salts having available acidic hydrogen can be utilized for reaction with carbon dioxide liberating agents in place of the above referred to organic acids. Potassium acid tartrate is illustrative of acid salts which can be utilized.

The preferred carbon dioxide liberating agents used herein are the alkali and alkaline earth carbonates and bicarbonates illustrated by such compounds as, for example, lithium, sodium, potassium, calcium, strontium, barium, and ammonium carbonates and bicarbonates. Excellent results are obtained by the use of sodium bicarbonate.

It will be realized that the carbonates and bicarbonates of other alkali or alkaline earth metals can be utilized herein. The criterion of acceptability for a carbon dioxide liberating agent useful herein, is the ability of such agent to react with the afore-described organic acids at suitable extruder temperatures to yield water and carbon dioxide.

As used herein the term "conventional" extrusion equipment embraces the various plastic extruders commonly used to extrude polymers of such monomers as, for example, styrene, vinyl and vinylidene chloride, ethylene, acrylonitrile and the like. In these conventional extruders the polymeric material is fed in to a hopper which is not pressurized. It is a feature of this invention that the above described extrudable, expandable compositions can be placed in the hoppers of conventional extruders and extruded to produce expanded or foamed polystyrene without making provision for preventing the escape of expanding agent from the hopper as is necessary in the case, for example, of normally gaseous expanding agents.

As has been described before, it is possible, utilizing the compositions and methods of this invention, to produce foamed polystyrene having the desirable substantially uniform small voids. The term "small" is used to illustrate the difference between the voids found in commercially available extruded foamed polystyrene and the voids found in foamed polystyrene produced by the method of expansion and the compositions of this invention. The size of the voids in this latter polystyrene is markedly smaller, that is, in the order of one-third or less, than the size of voids found in commercially available foamed polystyrene. The small void size is of course desirable, particularly, for example, when the polystyrene is utilized for insulation purposes.

The compositions of this invention can be prepared by starting with styrene polymers which have had incorporated substantially uniformly there in an aliphatic hydrocarbon such as, for example, petroleum ether, particularly the pentane and/or hexane fractions. Conveniently polystyrene beads produced by suspension polymerization and into which petroleum ether has been incorporated are utilized. These petroleum ether-containing polystyrene beads are admixed in the dry state with, for example, appropriate amounts of sodium bicarbonate and citric acid. The admixture can be accomplished in conventional dry blending equipment such as, for example, a ribbon blender. This admixture can then be fed to the hopper of a conventional extruder and extruded at a temperature of, for example, approximately 315° F. There is obtained foamed polystyrene having substantially uniform small voids.

As used herein the terms "percentage" and "parts" are used to indicate percentage and parts by weight unless otherwise indicated.

*Example I*

Polystyrene beads having incorporated therein 6.1 percent petroleum ether (pentane fraction) are admixed on a ribbon blender with 1.37 percent oxalic acid dihydrate and 1.82 percent sodium bicarbonate. This mixture is extruded in a conventional plastic extruder at a temperature of 315° F. There is obtained a foamed polystyrene having a density of 3.4 lbs. per cubic foot and having substantially uniform small voids.

Extrusion under similar conditions of the polystyrene containing 6.1 percent by weight petroleum ether (pentane fraction) without admixture with the oxalic acid and sodium bicarbonate yielded a product having a density of 47.5 lbs. per cubic foot.

The coaction of the three elements, that is, petroleum ether, acid and carbon dioxide liberating agent is further illustrated by the fact that omission of the petroleum ether from the afore-described composition yields unsatisfactory results. That is, polystyrene containing no petroleum ether which is admixed with 1.37 percent oxalic acid dihydrate and 1.82 percent sodium bicarbonate is extruded at a die temperature of 450° F. There is obtained polystyrene having a density of 51 lbs. per cubic foot. Additionally, a 7-fold increase of both the acid and bicarbonate in the immediately foregoing mixture and extrusion of 450° F. yields a product having a density of 46.8 lbs. per cubic foot. It is to be noted that in the extrusion in which no petroleum ether is present in the mixture it is necessary to operate at a temperature of about 450° C. which is possibly explained by the fact that the presence of petroleum ether in the previously described experiments act as a lubricant for the polystyrene, therefore allowing a lower extrusion temperature of 315° F.

It is noted in the foregoing procedure that the respective percentages of oxalic acid and sodium bicarbonate are calculated to yield 1.74 percent water and carbon dioxide based on the weight of polystyrene containing petroleum ether.

*Example II*

A series of experiments are performed in which citric acid hydrate and sodium bicarbonate are utilized and the amounts varied to yield varying percentages of water and carbon dioxide. Polystyrene beads, into which have been incorporated 6.1 per cent petroleum ether (petane fraction) are admixed on a ribbon blender with the below indicated amounts of citric acid hydrate and sodium bicarbonate and extruded at a temperature of approximately 315° F. There is obtained foamed polystyrene having substantially uniform small voids of the indicated densities.

| Run No. | Percent Citric Acid Hydrate | Percent Sodium Bicarbonate | Calculated Percent $H_2O$ and $CO_2$ | Density, Lbs. per Cu. Ft. |
|---|---|---|---|---|
| 1 | 1.54 | 1.82 | 1.74 | 4.60 |
| 2 | 0.77 | 0.91 | 0.87 | 4.31 |
| 3 | 0.38 | 0.45 | 0.43 | 4.01 |
| 4 | 0.19 | 0.23 | 0.22 | 4.22 |

It is to be noted that when using citric acid the combination of citric acid and bicarbonate has excellent adherence to the polystyrene beads. Apparently the particular characteristics of citric acid are such that the acid and carbonate tend to form well adhering coating on the polystyrene beads so that the individual beads have in close proximity thereto the acid and carbon dioxide liberating agent. This adherence of the carbonate and acid is of particular advantage in that the compositions can be shipped without dusting, which tends to make the composition less homogeneous.

*Example III*

Example II is repeated substituting for the citric acid there used an equivalent amount of oxalic acid. Substantially similar results are obtained.

*Example IV*

Example II is repeated substituting for the citric acid there used an equivalent amount of diglycollic acid. Substantially similar results are obtained.

*Example V*

Example II is repeated substituting for the citric acid there used an equivalent amount of tartaric acid. Substantially similar results are obtained.

Example VI

Example II is repeated substituting for the citric acid there used an equivalent amount of succinic acid. Substantially similar results are obtained.

Example VII

Polystyrene beads having incorporated therein 7.6 percent petroleum ether (pentane fraction) are blended on a ribbon blender with 9.0 percent stearic acid and 1.82 percent sodium bicarbonate. The mixture is extruded at a temperature of 315° F. There is obtained a foamed polystyrene having a density of 8.8 lbs. per cubic foot and having substantially uniform small voids. It is to be noted that the foamed polystyrene has a waxy surface probably due to the amount of stearic acid utilized.

Extrusion under similar conditions of the polystyrene containing 7.6 percent by weight petroleum ether (pentane fraction) without admixture with the stearic acid and sodium bicarbonate yields a product having a density in the range 40-50 lbs. per cubic foot.

It will be realized that equivalent amounts of organic acids having at least 3.0 milli-equivalents of acid hydrogen per gram and particularly those having about 3-10 milli-equivalents of acidic hydrogen per gram can be utilized in the foregoing example in place of the stearic acid there used and that similar results are obtained. It will be realized that the greater the acidic hydrogen content of an acid a smaller amount of it is required and that, as this amount decreases, effects, such as the above-referred to waxy surface with stearic acid, decrease and disappear.

The relative viscosity of a one percent toluene solution of polystyrene utilized in the foregoing example is approximately 2.4. It will be realized that a variety of polystyrenes can be utilized in the compositions and methods of this invention. For example, polystyrenes having relative viscosities in the range of from about 1.2 to 2.8 (one percent toluene solution, Ostwald viscosimeter) yield good results. Further, it will be realized that copolymers of styrene or physical admixtures of polystyrene with an elastomeric material which are known as "high impact" polystyrenes can be utilized herein.

Example VIII

Bead polystyrene, a one percent solution of which has a relative viscosity 1.6, having integrated therein 7.5 percent petroleum ether (pentane fraction) is admixed in a ribbon blender with 1.54 citric acid hydrate and 1.82 percent sodium bicarbonate and extruded at a temperature of approximately 280° F. There is obtained foamed polystyrene having substantially uniform small voids and density in the range of 4-4.5 lbs. per cubic foot.

It will be realized that equivalent weights of the afore-described acids can be substituted in the foregoing procedures for the oxalic, citric and stearic acids used therein. Similarly, the above-described carbon dioxide liberating agents, particularly such compounds as sodium carbonate, potassium carbonate and bicarbonate and ammonium carbonate can be substituted in equivalent quantities for the sodium bicarbonate utilized in the foregoing procedures.

It is to be noted that coloring agents can be dry blended with the various above-described components of the compositions of this invention and that upon extrusion there is obtained a colored foamed polystyrene.

Additionally, this invention embraces compositions comprising the aforementioned acids and carbon dioxide liberating agents in combination with polystyrene beads having integrated therewith from about four and one-half to nine percent of an aliphatic hydrocarbon, boiling in the range 30-90° C., which beads have been admixed with a highly halogenated non-volatile hydrocarbon and antimony oxide. These polystyrene mixtures can be extruded according to the method of this invention to produce flame-retardant foamed polystyrene. The highly halogenated non-volatile hydrocarbons which are useful are, in general, substances that contain in excess of 50 percent halogen and which boil about 200° C. at atmospheric pressure. These materials are illustrated by such commercially available compounds as Chlorowax 70 and Halowax 1051X. Finely divided antimony oxide which is commercially available is useful herein.

The useful admixtures of aliphatic hydrocarbon containing polystyrene beads, highly halogenated non-volatile hydrocarbon and ethylene oxide are described and claimed in the copending application of John J. Killoran et al., Serial No. 410,761, filed February 17, 1954.

While the invention has been described with reference to particular embodiments thereof, it will be understood that in its broadest aspects the invention may be variously embodied within the scope of the invention as set forth herein and in the appended claims.

What is claimed is:

1. A composition capable of being foamed and extruded in one operation comprising polystyrene particles, having integrated therewith from about four and one-half to nine percent of an aliphatic hydrocarbon boiling approximately in the range 30-90° C. homogeneously admixed with a carbon dioxide liberating agent chosen from the class consisting of the alkali and alkaline earth carbonates and bicarbonates and a solid organic acid having at least about 3.0 milli-equivalents of acidic hydrogen per gram in amounts to produce upon reaction a total of from about one-tenth to five percent, based on the polystyrene particles containing the aliphatic hydrocarbon, of water and carbon dioxide.

2. A composition capable of being foamed and extruded in one operation comprising polystyrene particles having integrated therewith about 6-8 percent of petroleum ether boiling approximately in the range 30-70° C. homogeneously admixed with a carbon dioxide liberating agent chosen from the class consisting of the alkali and alkaline earth carbonates and bicarbonates and a solid organic acid having at least about 10 milli-equivalents of acidic hydrogen per gram in amounts to produce upon reaction a total of from about one-tenth to one percent, based on the polystyrene particles containing the petroleum ether, of water and carbon dioxide.

3. A composition of claim 2 in which the carbon dioxide liberating agent is sodium bicarbonate and the organic acid is citric acid.

4. A composition of claim 2 in which the carbon dioxide liberating agent is sodium bicarbonate and the organic acid is oxalic acid.

5. A composition of claim 2 in which the carbon dioxide liberating agent is sodium bicarbonate and the organic acid is diglycollic acid.

6. A composition of claim 2 in which the carbon dioxide liberating agent is sodium bicarbonate and the organic acid is tartaric acid.

7. A composition of claim 2 in which the carbon dioxide liberating agent is sodium bicarbonate and the organic acid is succinic acid.

8. A method of producing foamed, extruded polystyrene having a density not greater than about ten pounds per cubic foot and small uniform voids comprising homogeneously admixing polystyrene particles having integrated therewith from about four and a half to nine percent of an aliphatic hydrocarbon boiling approximately in the range 30-90° C. homogeneously admixed with a carbon dioxide liberating agent selected from the group consisting of the alkali and alkaline earth carbonates and bicarbonates and a solid organic acid having at least about 3.0 milli-equivalents of acidic hydrogen per gram in amounts to produce upon reaction a total of from about one-tenth to five percent, based on the polystyrene particles containing the aliphatic hydrocarbon, of water and carbon dioxide, and simultaneously foaming and extruding said mixture in a conventional extrusion machine at a temperature in the range of from about 250° to 400° F.

9. The method of producing foamed, extruded polystyrene having a density not greater than about 4.5 lbs. per cubic foot and small uniform voids comprising admixing polystyrene particles having integrated therewith about 6–8 percent of petroleum ether boiling approximately in the range 30–70° C. homogeneously admixed with a carbon dioxide liberating agent chosen from the class consisting of the alkali and alkaline earth carbonates and bicarbonates and a solid organic acid having at least about 10 milliequivalents of acidic hydrogen per gram in amounts to produce upon reaction a total of from two-tenths to two percent, based on the polystyrene particles containing the petroleum ether, of water and carbon dioxide, and simultaneously foaming and extruding said admixture in a conventional extruding machine at a temperture in the range of about 300–350° F.

10. The method of claim 9 in which the carbon dioxide liberating agent is sodium bicarbonate and the organic acid is citric acid.

11. The method of claim 9 in which the carbon dioxide liberating agent is sodium bicarbonate and the organic acid is oxalic acid.

12. The method of claim 9 in which the carbon dioxide liberating agent is sodium bicarbonate and the organic acid is diglycollic acid.

13. The method of claim 9 in which the carbon dioxide liberating agent is sodium bicarbonate and the organic acid is tartaric acid.

14. The method of claim 9 in which the carbon dioxide liberating agent is sodium bicarbonate and the organic acid is succinic acid.

References Cited in the file of this patent

UNITED STATES PATENTS

| | | |
|---|---|---|
| 2,386,995 | Wigal | Oct. 16, 1945 |
| 2,442,940 | Staudinger et al. | June 8, 1948 |
| 2,478,879 | Ten Broeck | Aug. 9, 1949 |
| 2,576,977 | Stober | Dec. 4, 1951 |
| 2,681,321 | Stastny et al. | June 15, 1954 |

OTHER REFERENCES

Plastics Word, page 4, March 1954.

Dylite, Expandable Polystyrene, by Koppers Company, Inc., copyright 1954, pages 14–16.